350-6.1 SR
RWE28 XR 3,144,511

MECHANICAL SCANNING DEVICE WITH OPTICS HAVING PIN-CUSHION DISTORTION TO PROVIDE LINEAR SCANNING RATE

Filed June 26, 1961

INVENTOR.
ALBERT BOUWERS
BY
Wenderoth, Lind & Ponack
ATTORNEYS

United States Patent Office 3,144,511

Patented Aug. 11, 1964

3,144,511

MECHANICAL SCANNING DEVICE WITH OPTICS HAVING PIN-CUSHION DISTORTION TO PROVIDE LINEAR SCANNING RATE

Albert Bouwers, The Hague, Netherlands, assignor to N.V. Optische Industrie "De Oude Delft," Delft, Netherlands Filed June 26, 1961, Ser. No. 119,452
Claims priority, application Netherlands June 28, 1960
1 Claim. (Cl. 178—7.1)

Figure 1:
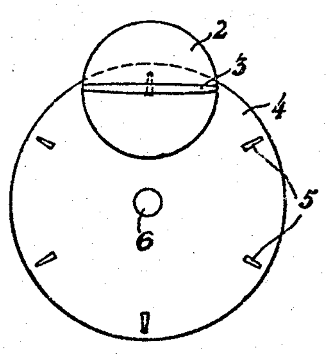

The invention relates to the scanning of optical images and, more particularly, to a device for periodically scanning a narrow strip of an optical image which comprises a disc positioned in the image plane and having radial light transmitting slots, a diaphragm fixedly positioned immediately adjacent the said scanning disc and having a rectilinear light transmitting slot corresponding to the strip to be scanned, and a light sensitive electrical signal generating element positioned behind the image plane so as to receive light which is transmitted at the crossing point of said slots.

Scanning devices of this general type are well-known in the art of television and have performed satisfactorily. Yet, they have a number of drawbacks of which some will be indicated here and which result from the fact that the scanning conditions are not identical for all points of the strip or image line to be scanned. A first point is that the elementary surface of the image (image point) which is discovered at the crossing point of the fixed slot and one of the movable slots varies its area in the course of the scanning of the strip as a result of the varying angle between the crossing slots. Consequently, the sensitivity, that is the output signal per unit of brightness of the image, varies with the location of the scanned point in the image. A further disadvantageous effect resides in that the speed at which the image point scanned moves along the strip is not constant but is lower in the intermediate portion of the strip than at the ends. From this variation in scanning speed there results a certain compression in the border portions of a displayed image such as obtained, e.g., on the screen of a kinescope connected to the scanning device.

It is the object of the present invention to avoid such drawbacks of the prior devices.

According to the invention the slot in the diaphragm and/or the slots in the scanning disc have a width which is not constant along the length of the slot but varies in such a manner that the surface area which is discovered by the slots is substantially constant along the strip to be scanned. In this way image points which have equal brightness always create equal electrical output signals in the light sensitive element. Preferably, the scanning device according to the invention comprises an objective for forming the image to be scanned which introduces pin-cushion distortion. This type of distortion, as is well-known, is characterized by a certain amount of expansion in the border parts of the image as contrary to the compression caused by the variations in scanning speed. Hence, the effects of such compression can be partly or wholly compensated by the distortion of the image forming objective.

Figure 2:
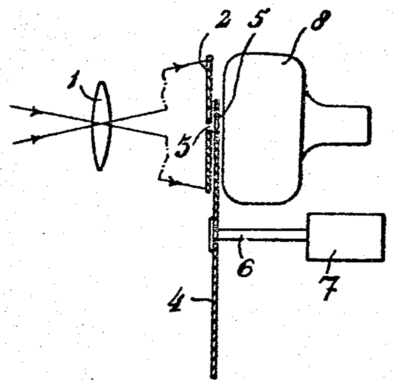

In the drawing an example of a scanning device constructed in accordance with the invention is shown, of which:

FIG. 1 is an elevational view of the diaphragm and scanning disc assembly, viewed from the side of the light sensitive element, and FIG. 2 is a side view, partly cross-section of the device of FIG. 1.

An objective 1 (see FIG. 2) forms an image of an object in the plane of a diaphragm 2 which is provided with a straight narrow slot 3 having the approximate width of an image line to be scanned. The object (not shown) may be, e.g., a photographic film or a scene which moves at constant speed along the scanning device, such that subsequent lines of the image are projected at the level of slot 5 in order to be scanned. Slot 3 has a width which is slightly varying along the length of the slot. The width is largest in the intermediate parts of the slot and is made progressively smaller towards both ends. Immediately adjacent the diaphragm and, hence, practically in the image plane too, a scanning disc 4 is mounted which has a number of, e.g., six, radial slots 5. The slots 5 have a width which is substantially equal to the width of the fixed slot 3 but are slightly tapering towards the periphery of the disc. Their length is such that, when the disc 4 is rotated by means of its shaft 6, there is at all times one point of the fixed slot 3 which is discovered by one of the moving slots 5. The disc is driven by an electric motor 7. Behind the image plane a photomultiplier tube 8 having a large photo-cathode is provided which receives all the light transmitted by the slots and generates a video signal in response to such light. The manner in which this electrical signal is used does not constitute a part of the present invention and need not further be discussed here.

Only in the middle point of the fixed slot 3 the moving slots 5 cross the fixed slot perpendicularly. Thus, if slots of constant width are used the surface element discovered, with the exception of the middle point of the slot 3, will always be a rhomb whose area will increase towards the ends of the fixed slot. In the scanning device shown, however, this effect is compensated for as the slots become narrower towards both ends of the line to be scanned. Moreover, with slots of constant width, the image point defined by the slots will increase its horizontal dimension notably at the ends of the line if compared with the intermediate part, thereby causing somewhat of a smearing effect in horizontal direction. This effect is notably reduced by the present invention and the resultant sharpness in the edges of the image is improved.

When disc 4 is driven at uniform speed, the scanning speed is higher at the ends of the slot 3 than in the intermediate part. The maximum variation is about 15% in the device shown which has six radial slots in the scanning disc. The effect of this variation can be easily compensated for, according to the present invention, by the use for the objective 1 of a lens which may be well corrected for all optical aberrations impairing image definition but introduces a proper amount of pincushion distortion. Such a lens, if properly adapted to the scanning device, expands the edge parts of the image in the slot 3 to such an amount that the compressing effect of the disc 4 is satisfactorily compensated.

It will be understood that in the prior art devices having slots of constant width the influence of the disturbing effects mentioned hereinbefore will be greater if the scanning disc has fewer slots. This results from the fact that the oblique angle under which the slots cross each other near the ends of the line becomes smaller. Thus, the invention provides the possibility to use smaller discs with fewer slots whereby the dimensions of the scanning device may be appreciably reduced.

It will further be understood, that it is not essential for the invention that the moving slots 5 and the fixed slot 3 have both variable widths. The advantageous effects of the invention may also be obtained if either the fixed slot or the movable slots have a variable width which becomes progressively smaller as the slots cross each other under a smaller angle.

What I claim is:

In a device for periodically scanning a narrow strip of an optical image, an optical objective having pin-cushion distortion which forms the image to be scanned, a disc positioned in the image plane of the objective and having a plurality of radial rectilinear light transmitting slots, means to rotate said disc at a substantially uniform speed, a diaphragm fixedly positioned immediately adjacent said scanning disc having a rectilinear light transmitting slot corresponding to the strip to be scanned, said slot in said diaphragm having a width varying along the length of said slot and said slots in said scanning disc having a width varying along the length of said slots so that the area of the surface element discovered at the crossing point of the slots is substantially constant along the strip to be scanned, and a light sensitiv trical signal generating element positioned behir image plane to receive light transmitted at the ing points of said slots, the amount of pin-cushic tortion of said optical objective being so as to su tially compensate for variations in travel speed crossing point of said slots along the strip to be sc when said disc is rotated at said uniform speed.

References Cited in the file of this patent

UNITED STATES PATENTS

| | | |
|---|---|---|
| 1,842,759 | Malm | Jan. 26, |
| 2,379,438 | Hogan | July 3, |
| 2,978,948 | Kimber | Apr. 11, |